United States Patent
Cooper et al.

(10) Patent No.: US 8,521,345 B2
(45) Date of Patent: Aug. 27, 2013

(54) SYSTEM AND METHOD FOR RAIL VEHICLE TIME SYNCHRONIZATION

(75) Inventors: Jared K. Cooper, Melbourne, FL (US); Brian Murren, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/338,558

(22) Filed: Dec. 28, 2011

(65) Prior Publication Data

US 2013/0173093 A1    Jul. 4, 2013

(51) Int. Cl.
*G06F 17/00*  (2006.01)

(52) U.S. Cl.
USPC .......................................................... 701/19

(58) Field of Classification Search
USPC .......................................................... 701/19
See application file for complete search history.

(56) References Cited

U.S. PATENT DOCUMENTS

| | | | |
|---|---|---|---|
| 4,042,810 A * | 8/1977 | Mosher | 701/19 |
| 6,691,957 B2 * | 2/2004 | Hess et al. | 246/186 |
| 6,751,573 B1 * | 6/2004 | Burch | 702/178 |
| 7,406,379 B2 * | 7/2008 | Volk et al. | 701/536 |
| 8,239,078 B2 * | 8/2012 | Siddappa et al. | 701/19 |
| 2002/0029097 A1 * | 3/2002 | Pionzio et al. | 700/286 |
| 2003/0040853 A1 * | 2/2003 | Brousseau et al. | 701/19 |
| 2004/0006413 A1 | 1/2004 | Kane | |
| 2004/0172175 A1 | 9/2004 | Julich | |
| 2005/0189815 A1 * | 9/2005 | Bryant | 303/7 |
| 2006/0138285 A1 * | 6/2006 | Oleski et al. | 246/167 R |
| 2007/0133724 A1 * | 6/2007 | Mazereeuw et al. | 375/354 |
| 2007/0219682 A1 | 9/2007 | Kumar | |
| 2007/0225878 A1 * | 9/2007 | Kumar et al. | 701/19 |
| 2007/0233335 A1 * | 10/2007 | Kumar et al. | 701/22 |
| 2008/0109124 A1 | 5/2008 | Daum | |
| 2008/0128562 A1 * | 6/2008 | Kumar et al. | 246/186 |
| 2008/0154452 A1 * | 6/2008 | Kapp et al. | 701/20 |
| 2008/0195269 A1 * | 8/2008 | Lacy et al. | 701/24 |
| 2008/0201019 A1 * | 8/2008 | Kumar et al. | 700/286 |
| 2008/0312775 A1 * | 12/2008 | Kumar | 701/2 |
| 2009/0090818 A1 * | 4/2009 | Kumar | 246/186 |
| 2009/0105893 A1 | 4/2009 | Kernwein | |
| 2010/0262321 A1 * | 10/2010 | Daum et al. | 701/20 |
| 2011/0172856 A1 * | 7/2011 | Kull | 701/19 |
| 2012/0093647 A1 * | 4/2012 | Bengtson et al. | 416/61 |
| 2012/0290182 A1 * | 11/2012 | Cooper et al. | 701/70 |
| 2012/0290185 A1 * | 11/2012 | Cooper et al. | 701/93 |

FOREIGN PATENT DOCUMENTS

| | | | |
|---|---|---|---|
| CA | 2526224 A1 | 12/2004 | |
| EP | 2219086 A1 | 8/2010 | |

OTHER PUBLICATIONS

Jandaghia, M. et al: "Decision Making Strategies for Intelligent Control system of Train Speed & Train Dispatch in Iran Railway", Intelligent Transportation Systems, 2008. ITSC 2008. 11th International IEEE Conference, Oct. 12-15, 2008, pp. 681-686.

* cited by examiner

*Primary Examiner* — Thomas Tarcza
*Assistant Examiner* — Alex C Dunn
(74) *Attorney, Agent, or Firm* — GE Global Patent Operation; John A. Kramer

(57) ABSTRACT

A communication method includes the steps of, at a first system, communicating with a second system for the establishment of a mutual clock and, at the first system, performing a first set of operations based on the mutual clock and performing a different, second set of operations based on a first clock of the first system, wherein the first clock is different from the mutual clock.

18 Claims, 2 Drawing Sheets

SYSTEM AND METHOD FOR RAIL VEHICLE TIME SYNCHRONIZATION

FIELD OF THE INVENTION

Embodiments of the invention relate generally to vehicles. Other embodiments relate to systems and methods for vehicle control.

BACKGROUND OF THE INVENTION

In a typical rail vehicle application, for example, locomotives in a consist, the on-board clock of the rail vehicle control system (e.g., CMU or communication management unit) is synchronized, for example, to an off-board clock when the rail vehicle is first initialized or powered up, but not during ongoing operation. In other words, while the on-board clock is synched initially, upon vehicle start-up, it is not synched thereafter during vehicle operation. As will be readily appreciated, the reason for not regularly synching the on-board clock subsequent to initialization is to maintain a consistent clock during vehicle operation, which is necessary for the precise operation of various systems on-board the rail vehicle, such as an event recorder. More specifically, with respect to the event recorder, a continuous time stream without any discontinuities is desired. If the on-board clock was re-synched during vehicle operation, discontinuities may manifest, which could disrupt the precise operation of the event recorder and other systems relying on the on-board clock.

With existing rail vehicles such as locomotives, because the CMU on-board clock is only synched upon vehicle initialization/start-up, the CMU clock may drift from off-board clocks. In a train with multiple locomotives, the CMU clock may also drift from the clocks of other locomotives. In certain systems, the time discrepancies between the CMU clock and an off-board clock, or the CMU clock and the clocks of other locomotives in the consist, can, however, be problematic. For example, for a vehicle control system where an on-board control system, such as an energy management system, works in conjunction with an off-board scheduler, if the clock of the on-board system doesn't match (i.e., isn't synched) the clock of the off-board system, accurate vehicle control cannot be achieved. For example, if the off-board system tells the on-board system that the train should be at a particular location at a particular time, and the clocks do not match, than the train may not be at the location at the correct time.

Accordingly, there is a need for a method and system for synchronizing the on-board clock of a rail vehicle with other clocks, including an off-board clock and/or the clocks on-board other rail vehicles in the consist.

BRIEF DESCRIPTION OF THE INVENTION

An embodiment of the invention relates to a system for rail vehicle control. The method includes the steps of, at a first system, communicating with a second system for the establishment of a mutual clock and, at the first system, performing a first set of operations based on the mutual clock and performing a different, second set of operations based on a first clock of the first system, wherein the first clock is different from the mutual clock.

Another embodiment of the invention relates to a system for rail vehicle control. The method includes the steps of, at a first system, communicating with a second system for the establishment of a mutual clock to be utilized by both the first system and the second system and, at the first system, performing a first set of operations based on the mutual clock and performing a different, second set of operations based on a first clock of the first system, wherein the first clock is different from the mutual clock.

Another embodiment relates to a vehicle control system. The control system comprises a first system for use with a first vehicle. The first system has an on-board first clock. The first system is configured to communicate with a second system that has a second clock. The first system is configured to establish a mutual clock with the second system. The mutual clock is different than the first clock. The first system is configured to perform a first set of operations based on the mutual clock and a second set of operations based on the first clock.

Yet another embodiment of the invention relates to a system for rail vehicle time synchronization. The system includes a first rail vehicle having a first system and an on-board first clock and a second system, having a second clock, in communication with the first system. The first and second system are configured to establish a mutual clock, the mutual clock being different than the first clock. In addition, the first system is configured to perform a first set of operations based on the mutual clock and a second set of operations based on the first clock.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
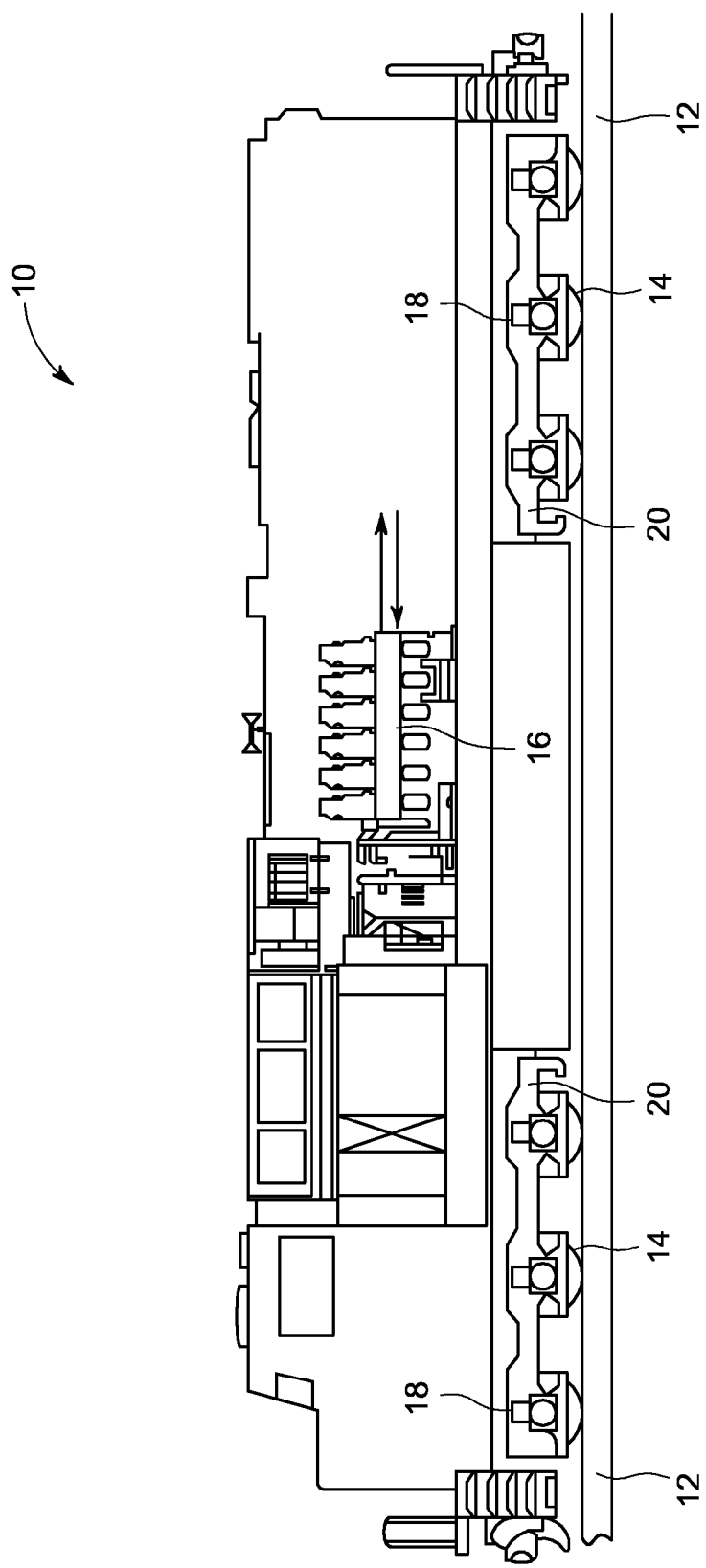
FIG. 1 is a schematic drawing of an exemplary rail vehicle.

Reference will be made below in detail to exemplary embodiments of the invention, examples of which are illustrated in the accompanying drawings. Wherever possible, the same reference numerals used throughout the drawings refer to the same or like parts. Although exemplary embodiments of the present invention are described with respect to locomotives, embodiments of the invention are also applicable for use with rail vehicles generally, meaning any vehicle that travels on a rail or track.

Embodiments of the invention relate to a system and method for rail vehicle time synchronization. FIG. 1 shows a schematic diagram of a rail vehicle, herein depicted as a locomotive 10, configured to run on a rail 12 via a plurality of wheels 14. As depicted, the locomotive 10 includes an engine 16, such as an internal combustion engine. A plurality of traction motors 18 are mounted on a truck frame 20, and are each connected to one of a plurality of wheels 14 to provide tractive power to propel and retard the motion of the locomotive 10. It is intended, however, that the present invention not be limited to locomotives or train consists specifically, but that the system and method of the present invention may be utilized in connection with rail vehicles and vehicle consists generally.

Figure 2:
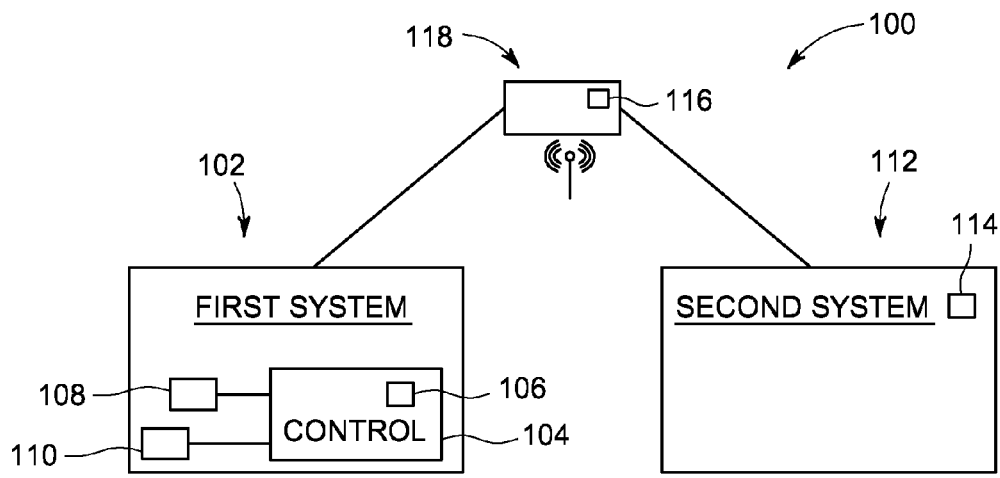
FIG. 2 is a block diagram of a system for rail vehicle time synchronization, according to an embodiment of the invention.

Turning now to FIG. 2, a system 100 for rail vehicle time synchronization according to an embodiment of the present invention is illustrated in the context of a locomotive represented by reference number 102. As shown therein, the locomotive 102 has an on-board control unit 104 having a processor configured to manage the operation of the locomotive 102 and the systems contained thereon. The control unit 104 may be rail vehicle control system (e.g., CMU or communication management unit), such as is known in the art. As shown therein, the control unit 104 includes an on-board first clock 106. The control unit 104 is electrically coupled to various on-board operational components and systems, such as an event recorder 108 and an energy management system 110. For purposes of the instant description of the invention, the locomotive 102 may be broadly considered to be a "first system" having a first on-board clock 106.

In an embodiment, the energy management system 110 may be integrated with the control unit 104. The event recorder 108 may be any type of data recorder known in the art and is configured to record data about the operation of train controls and performance in response to those controls and other train control systems. The event recorder 108 is synched with the first clock 106 so as to provide a continuous stream of time-specific recorded data such as speed, direction of travel, distance, throttle position, operation of brakes, status of headlights and marker lights, operation of horn, etc.

As further shown in FIG. 2, the system 100 also includes a second, off-board system, such as scheduler 112. In an embodiment, the second system/scheduler 112 communicates with the locomotive 102 through a communications link, e.g., a remote or radio communications link, GPS or other wireless link, such as known in the art, to direct the movement of the locomotive 102 from location to location. The second system/scheduler 112 includes a second clock 114 which is utilized by the scheduler 112 to establish a trip itinerary.

The system 100 further includes a third or "mutual," off-board clock 116. The third clock may be the time information available through a GPS system 118, although other clock types are certainly possible without departing from the broader aspects of the present invention. In an embodiment, the third clock may be a Network Time Protocol ("NTP") clock.

During initialization or startup, the first clock 106 on-board the rail vehicle/locomotive 102 may be synched, as alluded to above. Throughout travel the first clock 106 will be maintained, i.e., not augmented or subsequently synched, so as to provide a continuous time stream which is necessary for certain on-board systems and components, such as the event recorder 108. During travel, however, the on-board first clock 106 may drift from off-board clocks, such as second clock 104 of the scheduler 112. These discrepancies may be problematic. For example, with the exemplary rail vehicle 102 of FIG. 2, where the energy management system 110 works in conjunction with the off-board scheduler 112, if the on-board first clock 106 doesn't match with the off-board clock 114 of the scheduler 112, accurate vehicle may be difficult to achieve. For example, if the off-board scheduler 112 instructs the on-board control unit 104 that the train should be at a particular location by a particular time, and if the clocks don't match, then the train will not necessarily be at the location at the correct time.

The time synchronization system 100 and method of the present invention alleviates such issues. In particular, utilizing the system 100 of the present invention, the two systems, e.g., locomotive 102 and scheduler 112, agree to a third, mutual clock, e.g., GPS clock 116, when the systems first communicate (e.g., upon start-up). In ongoing operations for interaction between the two systems, the two systems will utilize the shared/third/sync/mutual clock 116. Importantly, after establishment of this mutual clock, the mutual clock will be utilized for communications between the first system (e.g., locomotive 102) and second system (e.g., scheduler 112) or for operations which require communication between the first system and second system. The first system may still utilize the first clock 106 for other operations where "mutual" time is unnecessary or, in fact, not desired, such as is the case for the event recorder 108.

In an embodiment, the first and second systems may alternatively agree or synch to one of the clocks integrated with the two systems (i.e., an independent third clock is not utilized). In particular, the first and second systems may agree to a mutual clock, wherein the mutual clock is one of the first clock (integrated with the first system) and the second clock (integrated with the second system). As described above, the first and second systems can each utilize the "mutual" clock for certain operations, while the first system may still utilize its first clock for certain other operations, and the second system may utilize its second clock for still yet other operations.

While the system 100 has been described in connection with a locomotive 102 communicating with an off-board scheduler 112, the present invention is not limited in this regard. In particular, the system 100 of the present invention may also be implemented among two different rail vehicles in the same consist.

Figure 3:
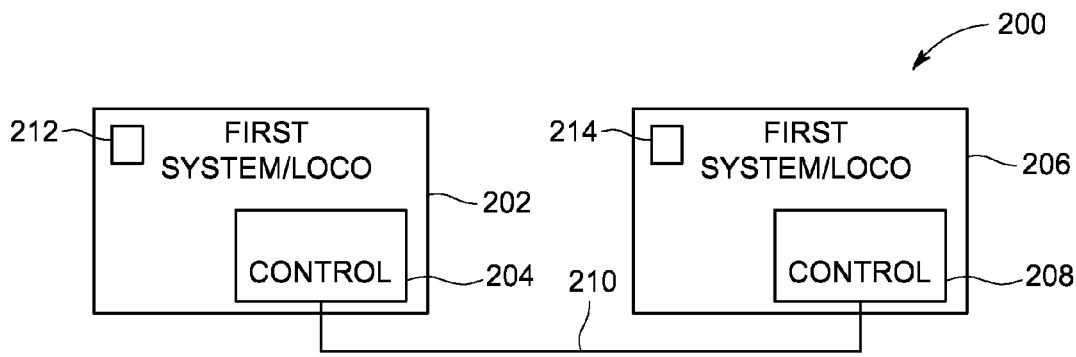
FIG. 3 is a block diagram of a system for rail vehicle time synchronization, according to an embodiment of the invention.
Figure 4:
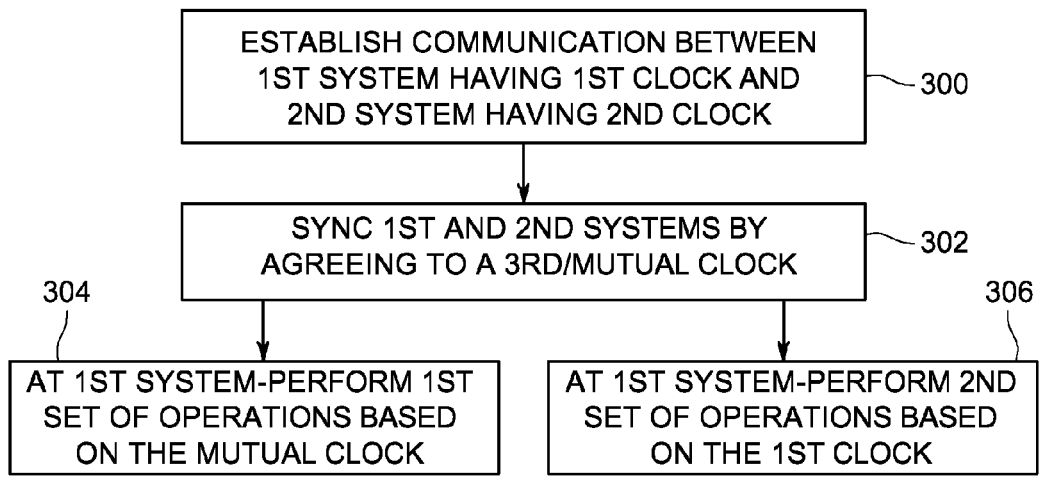
FIG. 4 is a flowchart illustrating a simplified subroutine of a method for rail vehicle time synchronization, according to an embodiment of the invention.

Referring now to FIG. 3, a system 200 for rail vehicle time synchronization for two or more rail vehicles in the same consist, in accordance with another embodiment of the present invention, is shown. The system includes a first rail vehicle or locomotive 202 having a first control unit 204 electrically coupled thereto that controls the operation of the locomotive and the systems contained thereon, and a second rail vehicle 206 or locomotive having, optionally, a second control unit 208. As further shown in FIG. 3, the locomotive control units are interconnected by an inter-consist communications link 210. It is contemplated that the link 210 may be any wired or wireless link between the locomotive control units such as wired or wireless distributed power (i.e., remote or radio communications), the MU cable which often provides a hard wire communication link among locomotives in the consist (low bandwidth), or a high bandwidth/network communications link between rail vehicles, as disclosed in U.S. Patent Application Publication No. 2011/0099413-A1, which is hereby incorporated by reference herein in its entirety. In an embodiment, the locomotive control units 204, 208 constitute an operator control for use by the operator to control one or more systems contained on the locomotives of the consist.

As shown in FIG. 3, the first locomotive 202 may be configured with a first clock 210 and the second locomotive may be configured with a second clock 212. During startup, the first and second locomotives 202, 206 may communicate with one another to establish a mutual clock in the manner discussed above. For example, the mutual clock may be one of the first clock 212 and the second clock 214. As discussed above, both the first and second locomotives 202, 206 may then utilize the mutual clock for certain operation, such as where a synched or agreed upon clock is necessary for accurate operation. Moreover, the first locomotive 202 may still utilize its integrated/on-board first clock 212 for certain operations, such as an on-board event recorder, and the second locomotive 206 may still utilize its integrated/on-board second clock 214 for yet other operations.

Alternatively, the first and second locomotives 202, 206 may agree to a third, mutual clock, wherein the third, mutual clock is an off-board clock such as that provided by a GPS system or the like, as discussed above.

A simplified subroutine for a method for rail vehicle time synchronization is depicted in FIG. 3. As shown at step 300, communication is first established between the first system having a first clock and a second system having a second clock. Upon communication, the first and second systems are then synched by agreeing to utilize a third or mutual clock, independent of the first and second clocks, at step 302. As shown at step 304, at the first system, a first set of operations may be performed based on the mutual clock. For example, one such operation may be the recording of operational data, such as by the event recorder on board a locomotive, as discussed above. As shown at step 306, at the first system, a second set of operations may be performed based instead on the first clock integrated with the first system. For example, one such operation may be the implementation of a trip itinerary, as established and communicated to a locomotive by an off-board scheduler.

In connection with the above description, the time synchronization system and method of the present invention is applicable to two systems, generally. More specifically, the time synchronization system and method may be implemented and carried out on two or more different vehicles in the same consist, as illustrated in FIG. 3, or between one vehicle and one off-board system, as illustrated in FIG. 2. While the embodiment shown in FIG. 2 contemplates a time synchronization system 100 and method for an on-board energy management system 110 (or other vehicle control system) and an off-board vehicle scheduling system 112, the two systems may be different distributed power systems (remote, radio communications) on two different rail vehicles/locomotives. Moreover, one system may be an on-board vehicle control system and the other system may be an off-board positive train control ("PTC") system or other off-board vehicle safety system, without departing from the broader aspects of the present invention.

In one embodiment, a system for vehicle control (e.g., rail vehicle control) is provided. The method includes the steps of, at a first system, communicating with a second system for the establishment of a mutual clock and, at the first system, performing a first set of operations based on the mutual clock and performing a different, second set of operations based on a first clock of the first system, wherein the first clock is different from the mutual clock. The method may further include the step of communicating with the second system for the establishment of the mutual clock to be used by both the first system and the second system. The second system may include a second clock, and the mutual clock is one of the first clock and the second clock. The mutual clock may be a GPS clock. In an embodiment, the first system may be an energy management system on-board a vehicle (e.g., a locomotive or other rail vehicle) and the second system may be an off-board vehicle scheduling system. Alternatively, the first system may be integrated with a first rail vehicle and the second system may be integrated with a second rail vehicle, wherein the first and second rail vehicles are in the same consist. The first system may be a first distributed power system on-board the first rail vehicle and the second system may be a second distributed power system on-board the second rail vehicle. Moreover, the first system may be a vehicle control system on-board a first rail vehicle and the second system may be an off-board positive train control system. Likewise, the first system may be a vehicle control system on-board a first vehicle and the second system may be an off-board vehicle safety system.

According to another embodiment of the present invention, a communication method is provided. The method includes the steps of, at a first system, communicating with a second system for the establishment of a mutual clock to be utilized by both the first system and the second system and, at the first system, performing a first set of operations based on the mutual clock and performing a different, second set of operations based on a first clock of the first system, wherein the first clock is different from the mutual clock. The method may also include the step of, at the second system, performing a different, third set of operations based on the mutual clock. The mutual clock may be a GPS clock. In an embodiment, the first system may be an energy management system on-board a vehicle (e.g., a locomotive or other rail vehicle) and the second system may be an off-board vehicle scheduling system. Moreover, the first system may be integrated with a first rail vehicle and the second system may be integrated with a second rail vehicle, wherein the first and second rail vehicles are in the same consist. In addition, the first system may be a first distributed power system on-board the first rail vehicle and the second system may be a second distributed power system on-board the second rail vehicle.

Another embodiment relates to a vehicle control system. The control system comprises a first system for use with a first vehicle. The first system has an on-board first clock. The first system is configured to communicate with a second system that has a second clock. The first system is configured to establish a mutual clock with the second system. The mutual clock is different than the first clock. The first system is configured to perform a first set of operations based on the mutual clock and a second set of operations based on the first clock.

In another embodiment of the control system, the control system is configured for rail vehicle time synchronization. The control system includes a first rail vehicle having a first system and an on-board first clock and a second system, having a second clock, in communication with the first system. The first and second systems are configured to establish a mutual clock, the mutual clock being different than the first clock. In addition, the first system is configured to perform a first set of operations based on the mutual clock and a second set of operations based on the first clock. The system may also include an event recorder on-board the first rail vehicle, wherein the first set of operations includes recording events utilizing the event recorder, the events including one or more of speed, direction of travel, distance, throttle position, operation of brakes, status of headlights and marker lights, and/or operation of horn. The mutual clock may be a GPS clock. In an embodiment, the first system may be an energy management system on-board the first rail vehicle and the second system may be an off-board vehicle scheduling system. The second system may be integrated with a second rail vehicle and the first and second rail vehicles may be in the same consist.

In an embodiment, a method of rail vehicle control comprises: synching a first on-board clock of a rail vehicle to an off-board clock, before commencing a trip of the rail vehicle; synching a second, independent on-board clock of the rail vehicle with a clock of an off-board rail vehicle scheduling system, thereby establishing a mutual clock between the rail vehicle and the off-board scheduling system; and during the trip, performing a first designated set of vehicle control operations (e.g., event recordings) according to the first on-board clock, and a second, different designated set of vehicle control operations (e.g., energy management, or train movement control) according to the second on-board clock. During the trip, the second on-board clock may be periodically re-synched with the clock of the off-board scheduling system. In other embodiments, the second on-board clock and the off-board scheduling system may agree to synch to a GPS clock or other clock source.

Although embodiments have been described herein in regards to rail vehicles, embodiments of the invention are also applicable to vehicles generally. Thus, for example, a first system (configured as described herein) may be on board a vehicle, and a second system (configured as described herein) may be an off-board vehicle scheduling system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for rail vehicle time synchronization, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A communication method comprising the steps of:
at an energy management system on-board a vehicle, communicating with an off-board vehicle scheduling system for the establishment of a mutual clock; and
at the energy management system, performing a first set of operations based on the mutual clock and performing a different, second set of operations based on a first clock of the energy management system, wherein the first clock is different from the mutual clock.

2. The method according to claim 1, further comprising the step of:
communicating with the vehicle scheduling system for the establishment of the mutual clock to be used by both the energy management system and the vehicle scheduling system.

3. The method according to claim 1, wherein:
the vehicle scheduling system includes a second clock; and
wherein the mutual clock is one of the first clock and the second clock.

4. The method according to claim 1, wherein:
the mutual clock is one of a GPS clock or a NTP clock.

5. The method according to claim 1, wherein:
the energy management system includes a vehicle control system on-board the vehicle; and
the vehicle scheduling system includes an off-board positive train control system.

6. The method according to claim 1, wherein:
the energy management system includes a vehicle control system on-board the vehicle; and
the vehicle scheduling system includes an off-board vehicle safety system.

7. A communication method comprising the steps of:
at a first system, communicating with a second system for the establishment of a mutual clock to be utilized by both the first system and the second system; and
at the first system, performing a first set of operations based on the mutual clock and performing a different, second set of operations based on a first clock of the first system, wherein the first clock is different from the mutual clock.

8. The method according to claim 7, further comprising the step of:
at the second system, performing a different, third set of operations based on the mutual clock.

9. The method according to claim 7, wherein:
the mutual clock is a GPS clock.

10. The method according to claim 7, wherein:
the first system is an energy management system on-board a rail vehicle; and
the second system is an off-board vehicle scheduling system.

11. The method according to claim 7, wherein:
the first system is integrated with a first rail vehicle; and
the second system is integrated with a second rail vehicle, the first and second rail vehicles being in the same consist.

12. The method according to claim 11, wherein:
the first system is a first distributed power system on-board the first rail vehicle; and
the second system is a second distributed power system on-board the second rail vehicle.

13. A vehicle control system comprising:

a first system for use with a first vehicle, the first system having an on-board first clock;

wherein the first system is configured to communicate with a second system, the second system having a second clock;

wherein the first system is configured to establish a mutual clock with the second system, the mutual clock being different than the first clock; and wherein the first system is configured to perform a first set of operations based on the mutual clock and a second set of operations based on the first clock.

14. A system for rail vehicle time synchronization, comprising:

a first system for use with a first rail vehicle, the first system having an on-board first clock; and a second system in communication with the first system, the second system having a second clock;

wherein the first and second systems are configured to establish a mutual clock, the mutual clock being different than the first clock; and wherein the first system is configured to perform a first set of operations based on the mutual clock and a second set of operations based on the first clock.

15. The system of claim 14, further comprising:

an event recorder on-board for use with the first rail vehicle;

wherein the second set of operations includes recording events utilizing the event recorder, the events including one or more of speed, direction of travel, distance, throttle position, operation of brakes, status of headlights and marker lights, or operation of horn.

16. The system of claim 14, wherein:

the mutual clock is a GPS clock.

17. The system of claim 14, wherein:

the first system is an energy management system on-board the first rail vehicle; and the second system is an off-board vehicle scheduling system.

18. The system of claim 14, wherein:

the second system is integrated with a second rail vehicle, the first and second rail vehicles being in the same consist.

* * * * *